United States Patent
Parry et al.

(10) Patent No.: US 12,315,388 B2
(45) Date of Patent: *May 27, 2025

(54) INTRAOSSEOUS INFUSION TRAINER

(71) Applicant: Techline Technologies, Inc., Willow Grove, PA (US)

(72) Inventors: Daniel J. Parry, Perkasie, PA (US); David J. Parry, Jr., Yardley, PA (US); Thomas D. Kelly, Bryn Mawr, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,854

(22) Filed: Mar. 21, 2024

(65) Prior Publication Data
US 2024/0233578 A1    Jul. 11, 2024

Related U.S. Application Data

(63) Continuation of application No. 17/314,143, filed on May 7, 2021, now Pat. No. 11,984,044, which is a continuation-in-part of application No. 16/806,219, filed on Mar. 2, 2020, now Pat. No. 11,195,434, and a continuation-in-part of application No. 16/806,595, filed on Mar. 2, 2020, now Pat. No. 11,195,435.

(60) Provisional application No. 63/163,078, filed on Mar. 19, 2021.

(51) Int. Cl.
  *G09B 23/30*    (2006.01)
  *G09B 23/28*    (2006.01)

(52) U.S. Cl.
  CPC ................... *G09B 23/285* (2013.01)

(58) Field of Classification Search
  CPC ...... G09B 23/28; G09B 23/285; G09B 23/30; G09B 23/303
  USPC ........................................................ 434/274
  See application file for complete search history.

(56) References Cited

U.S. PATENT DOCUMENTS

| | | | | |
|---|---|---|---|---|
| 8,100,695 | B2* | 1/2012 | Duprez .................. | G09B 23/28 434/267 |
| 8,460,003 | B2* | 6/2013 | Bevan .................... | G09B 23/28 434/262 |
| 8,491,309 | B2* | 7/2013 | Parry ..................... | G09B 23/30 434/272 |
| 9,070,307 | B2* | 6/2015 | Hammerman ........ | G09B 23/306 |
| 9,865,179 | B2* | 1/2018 | Segall .................. | G09B 23/288 |

(Continued)

*Primary Examiner* — Kurt Fernstrom
(74) *Attorney, Agent, or Firm* — Michael Crilly, Esquire

(57) ABSTRACT

A trainer for practicing an intraosseous infusion is presented. The trainer includes a mannequin and an injection-site simulant. The mannequin is in the form of a body, either human or animal, in part or whole. The injection-site simulant further includes a pocket, an insert, and an outer cover. The pocket extends into the mannequin. The insert simulates a hard exterior of a bone and is disposed within the pocket. The outer cover with a plug simulates a skin, either human or animal. The outer cover conceals the insert, pocket, and plug. The pocket and insert cooperate to form a cavity where marrow resides within the bone. The cavity is capable of receiving a fluid injected through a hole formed during use through the outer cover, plug, and insert. The plug sealingly contacts and cooperates with the insert and/or the wall within the pocket to confine the fluid within the cavity.

20 Claims, 5 Drawing Sheets

(56) References Cited

U.S. PATENT DOCUMENTS

| | | | | |
|---|---|---|---|---|
| 9,997,087 B2* | 6/2018 | Segall | .................. | G09B 23/288 |
| 10,559,228 B2* | 2/2020 | Rodriguez | ........... | G09B 23/303 |
| 10,818,200 B2* | 10/2020 | Rodriguez | ........... | G09B 23/303 |
| 11,195,435 B2* | 12/2021 | Parry | .................. | G09B 23/303 |
| 11,847,933 B2* | 12/2023 | Rodriguez | ........... | G09B 23/303 |
| 2014/0017650 A1* | 1/2014 | Romero | ................ | G09B 23/30 |
| | | | | 434/270 |
| 2014/0154656 A1* | 6/2014 | Segall | .................. | G09B 23/30 |
| | | | | 434/265 |
| 2015/0199921 A1* | 7/2015 | Segall | .................. | G09B 23/285 |
| | | | | 264/261 |
| 2018/0158374 A1* | 6/2018 | Zamierowski | ........ | G09B 23/285 |
| 2020/0258424 A1* | 8/2020 | Baker | .................... | A61M 5/20 |
| 2022/0327964 A1* | 10/2022 | Lavell | .................... | G09B 23/32 |

* cited by examiner

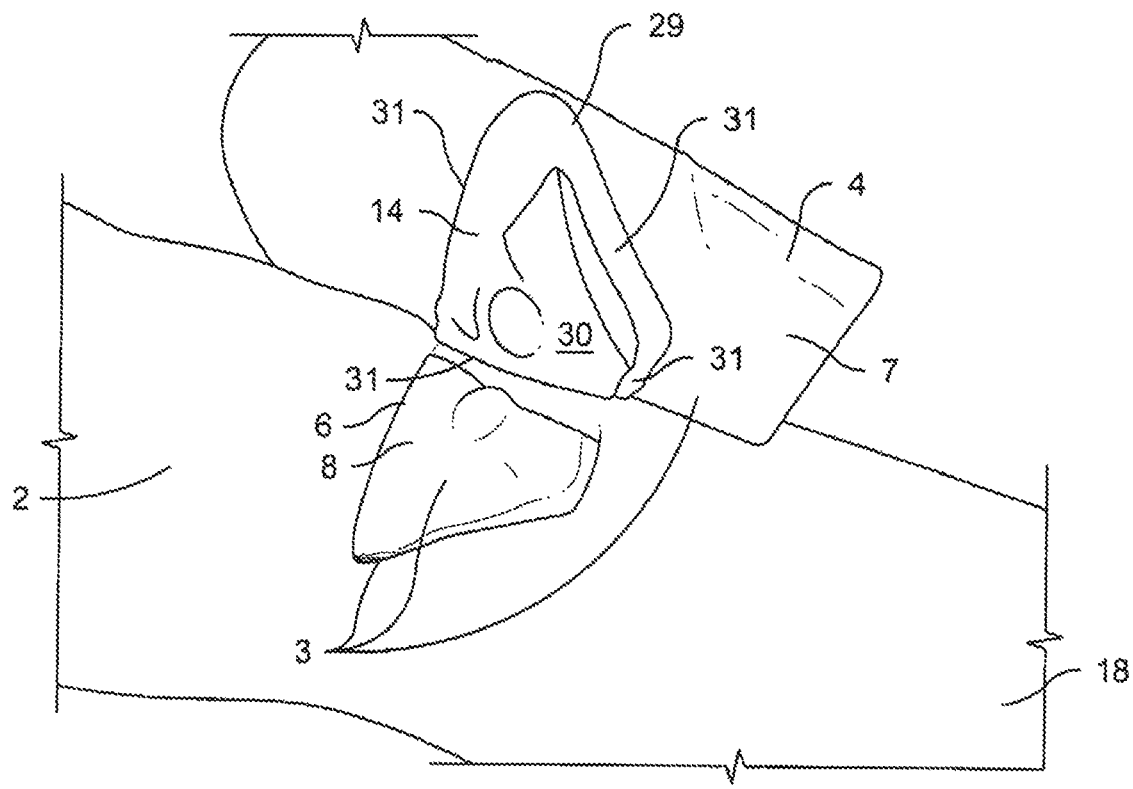
*Fig. 3*
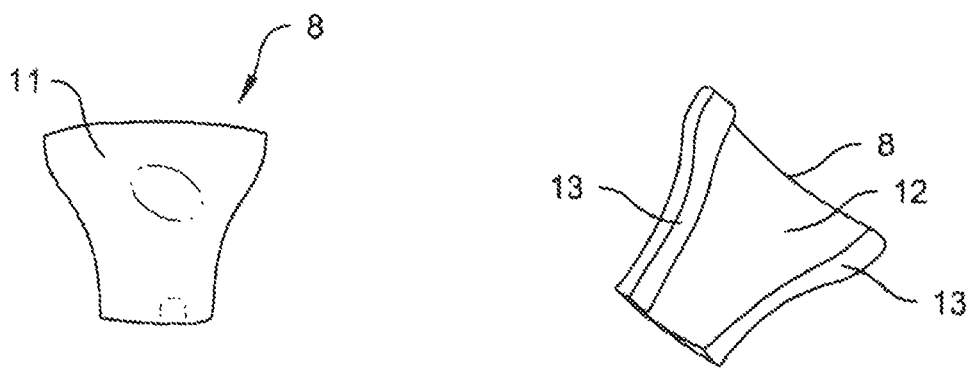
*Fig. 5*  *Fig. 6*

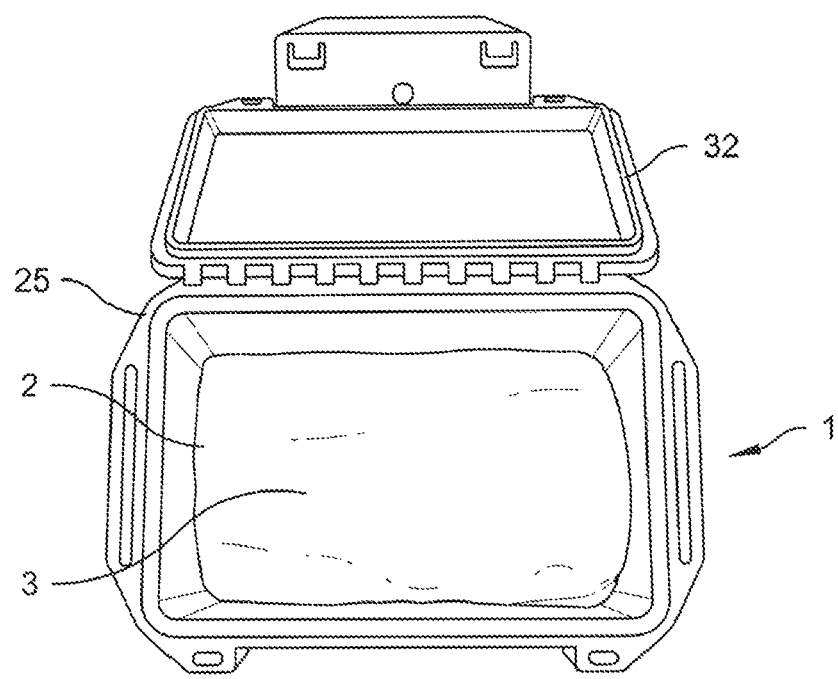
Fig. 10
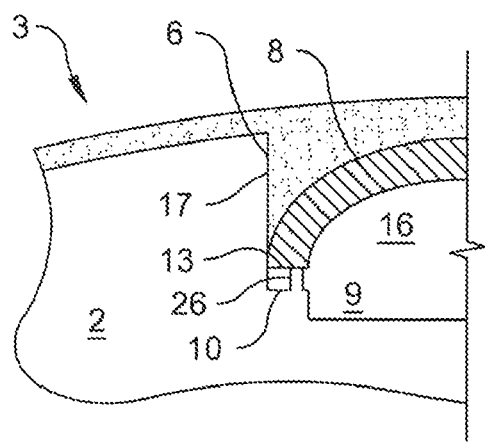 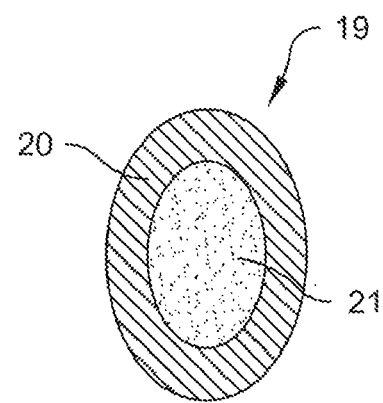
Fig. 11          Fig. 12

INTRAOSSEOUS INFUSION TRAINER

REFERENCE TO RELATED APPLICATIONS

This application is a continuation of U.S. Non-Provisional application Ser. No. 17/314,143 filed May 7, 2021 entitled Intraosseous Infusion Trainer, which claims priority to U.S. Provisional Patent Application No. 63/163,078 filed Mar. 19, 2021 entitled Intraosseous Infusion Trainer, and further U.S. Non-Provisional application Ser. No. 17/314,143 is a continuation-in-part of U.S. patent application Ser. No. 16/806,219 now U.S. Pat. No. 11,195,434 and U.S. patent application Ser. No. 16/806,595 now U.S. Pat. No. 11,195,435 each filed Mar. 2, 2020 and entitled Wound Box Trainer. The subject matters of the prior applications are incorporated in their entirety herein by reference thereto.

FEDERALLY SPONSORED RESEARCH AND DEVELOPMENT

None.

FIELD OF THE INVENTION

The disclosure generally relates to a device applicable to trauma-care training and more particularly is concerned, for example, with a trainer including a mannequin and an injection-site simulant thereon which allow for practice of an intraosseous infusion procedure. Specifically, the disclosure enables practice of the steps required to establish an intraosseous infusion whereby a fluid is injected directly into marrow within a bone when intravenous access is either not available or not feasible.

BACKGROUND OF THE INVENTION

An intraosseous infusion is a medical procedure often employed to stabilize a patient with combat-related injuries whereby a fluid is injected directly into the marrow within a bone. This procedure is beneficial in that the marrow provides an alternate pathway to the vascular system when access via intravenous means is neither available nor feasible.

The preferred location for an intraosseous infusion is along the tibia bone because features of the proximal portion are easily locatable via tactile means and accessible for proper placement of the infusion. However, other locations may be suitable, examples including but not limited to the femur bone, the pelvic bone, the humerus bone, and the sternum bone.

In its simplest form, the procedure to establish an intraosseous infusion includes several important steps. First, the bone is palpated to locate placement within an injection site. Then, a hole is formed, typically, by drilling into the hard exterior of the bone at the injection site. Next, a needle is inserted to the marrow via the hole. Finally, a fluid is injected into the marrow beneath the hard exterior via the needle.

Although the procedure is simple conceptually, it is often difficult to successfully perform in real-world applications. Therefore, a realistic intraosseous infusion trainer would be an invaluable addition to the field of trauma-care training.

Medical mannequins are often the trainer preferred by combat medics for practice of medical procedures. However, mannequins and other trainers known within the art do not include aspects specific to training of an intraosseous infusion. One such aspect is that a trainer should simulate a hard exterior of a bone, a marrow encased within the hard exterior, and skin/tissues/flesh disposed about the hard exterior so to allow a trainee to develop the skill set required to properly locate placement within an injection site, to properly penetrate the hard exterior, and to insert a needle to the location at which a fluid is properly communicated to the marrow. Another aspect is that a trainer should also properly receive the injected fluid at the location where the marrow resides. Furthermore, the trainer should minimize leakage of fluid from the injection site, simplify cleanup after a training session, and allow replacement of components penetrated during a training session.

Accordingly, what is required is a trainer in the form of a human or animal body, in part or whole, with a simulated injection site which enables practice of an intraosseous infusion procedure while minimizing leakage, simplifying cleanup, and permitting repair after use.

SUMMARY OF THE INVENTION

An object of the disclosure is a trainer in the form of a human or animal body, in part or whole, with a simulated injection site which enables practice of an intraosseous infusion procedure while minimizing leakage, simplifying cleanup, and permitting repair after use.

In accordance with some embodiments, the intraosseous infusion trainer includes a mannequin and an injection-site simulant. The mannequin is in the form of a body at least in part. The injection-site simulant includes a pocket, an insert, and an outer cover. The pocket is defined by a wall which extends into the mannequin. The insert simulates a hard exterior of a bone. The insert is disposed within the pocket. The outer cover simulates a skin. The outer cover includes a plug which extends into the pocket. The outer cover conceals the insert, the pocket, and the plug. The pocket and the insert cooperate to form a cavity within the pocket wherein the cavity is interposed between the pocket and the insert. The cavity is disposed where a marrow resides within the bone. The cavity is capable of receiving a fluid when injected through a hole formed in use through the outer cover, the plug, and the insert. The plug sealingly contacts and cooperates within the pocket with at least one of the insert or the wall to confine the fluid within the cavity.

In accordance with other embodiments, the outer cover and the plug is made of a silicone.

In accordance with other embodiments, the outer cover with the plug is removably secured to the mannequin.

In accordance with other embodiments, the outer cover with the plug is secured to the mannequin via a fastener.

In accordance with other embodiments, the insert is made of a urethane.

In accordance with other embodiments, the pocket includes a channel between a pair of shoulders which extend from the wall and the channel is a portion of the cavity.

In accordance with other embodiments, the insert is curved between a pair of ends, one of the two ends and one of the two shoulders sealingly contact, and another one of the two ends and another one of the two shoulders sealingly contact.

In accordance with other embodiments, the insert and the wall sealingly contact.

In accordance with other embodiments, a sealing force is applied by at least one of the insert or the wall at contact between the insert and the wall.

In accordance with other embodiments, a sealing force is applied by at least one of a face of the plug or an exterior of the insert at contact between the plug and the insert.

In accordance with other embodiments, a sealing force is applied by at least one of a side wall of the plug or the wall of the pocket at contact between the plug and the pocket.

In accordance with other embodiments, the insert approximates a thickness of the hard exterior.

In accordance with other embodiments, the outer cover is replaceable.

In accordance with other embodiments, a fill resides within the cavity.

In accordance with other embodiments, the insert is replaceable.

In accordance with other embodiments, the bone is one of a tibia bone, a femur bone, a pelvic bone, a humerus bone, or a sternum bone.

In accordance with other embodiments, the body is one of a leg, an arm, a shoulder, a torso, a chest, or a pelvis.

In accordance with other embodiments, the intraosseous infusion trainer further includes a case with said mannequin and said injection-site simulant therein.

In accordance with other embodiments, the mannequin is made of a urethane.

In accordance with other embodiments, the pocket includes a channel bounded by a shoulder which extends from the wall, the channel is a portion of the cavity, and the insert includes at least one end which engages a flange extending from the shoulder.

Several advantages are offered by one or more embodiments of the disclosure. The disclosure facilitates a realistic training experience so that a trainee may develop the skill set required to minimize risks and complications associated with an intraosseous infusion. The disclosure accepts and confines a fluid injected into the trainer in use so as to minimize leakage therefrom. The disclosure simplifies cleanup after a training session. The disclosure allows for replacement of component parts damaged or otherwise compromised during a training session.

The above and other objectives, features, and advantages of the present disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

FIG. 3 is a perspective view illustrating a pocket, an insert, and an outer cover with a plug of an injection-site simulant wherein the outer cover is partially removed to show the insert disposed within the pocket in accordance with an embodiment of the disclosure.

FIG. 5 is a front-side view illustrating an exterior side of an insert in accordance with an embodiment of the disclosure.

FIG. 6 is a perspective, rear-side view illustrating an interior side of an insert in accordance with an embodiment of the disclosure.

FIG. 10 is a perspective view illustrating a case of an intraosseous infusion trainer with a mannequin and an injection-site simulant disposed therein in accordance with an embodiment of the disclosure.

FIG. 11 is a cross-section view illustrating a pocket of an injection-site simulant wherein the pocket extends into a mannequin, the pocket includes a shoulder disposed about a channel, and a flange extends from the shoulder to permit contact with the insert in accordance with an embodiment of the disclosure.

FIG. 12 is a cross-section view illustrating elements of an exemplary bone suitable for an intraosseous infusion procedure.

DETAILED DESCRIPTION

Figure 1:
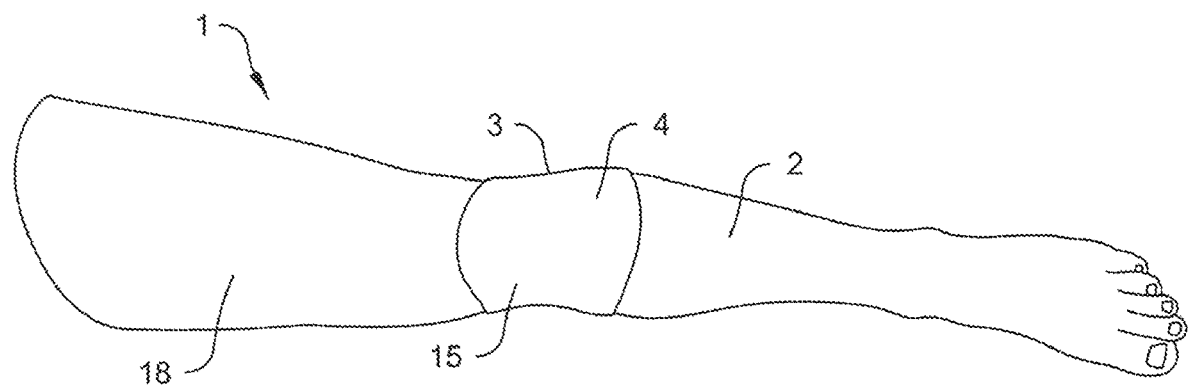
FIG. 1 is a front-side view illustrating an intraosseous infusion trainer including a mannequin and an injection-site simulant in accordance with an embodiment of the disclosure.

Reference will now be made in detail to several embodiments of the disclosure that are illustrated in the accompanying drawings. Wherever possible, same or similar reference numerals are used in the drawings and the description to refer to the same or like parts.

While features of various embodiments are separately described herein, it is understood that such features may be combinable to form other additional embodiments.

One or more components described herein may be manufactured via methods, processes, and techniques understood in the art, including, but not limited to, machining, molding, forming, and three-dimensional printing.

The drawing figures are not necessarily drawn to scale, but instead are drawn to provide a better understanding of the components thereof, and are not intended to be limiting in scope, but to provide exemplary illustrations.

The intraosseous infusion trainer 1 is described in conjunction with the reference numerals in FIGS. 1-12 so as to illustrate features of the various embodiments.

Referring now to FIG. 1, the intraosseous infusion trainer 1 includes a mannequin 2 and an injection-site simulant 3. The mannequin 2 may be in the form of a body in either whole or part. The body simulated by the mannequin 2 may replicate the appearance of a human or an animal, one non-limiting example of the latter being a dog. A non-limiting example of a body part is a leg, such as illustrated by the example in FIG. 1. Other non-limiting examples of a body part are an arm, a shoulder, a torso, a chest, or a pelvis. The mannequin 2 may include one or more parts comprised of a silicone, a urethane, and/or other suitable material(s). The injection-site simulant 3 is located along the mannequin 2 so as to correspond to a region with a bone therein at which an intraosseous infusion is performed. In several non-limiting examples, the bone may be a tibia, a femur, a pelvic, a humerus, or a sternum.

Figure 4:
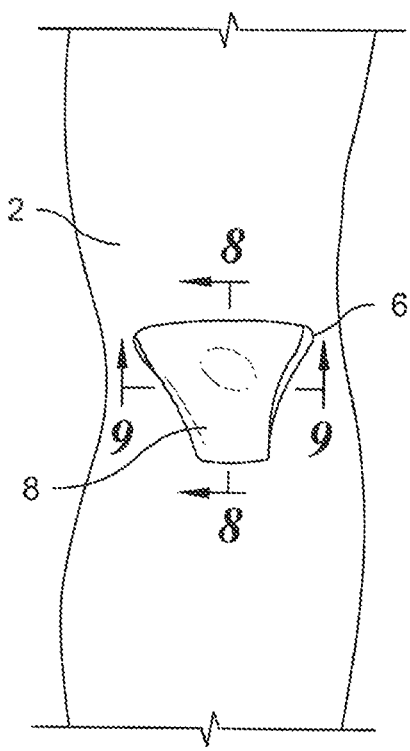
FIG. 4 is a front-side view illustrating a pocket and an insert of an injection-site simulant (outer cover not shown) wherein the bone-shaped insert is disposed within a similarly-shaped pocket along a mannequin in accordance with an embodiment of the disclosure.

Referring now to FIGS. 1, 3, and 4, the injection-site simulant 3 includes an outer cover 4, a pocket 6, and an insert 8. The outer cover 4 further includes a plug 14 which extends from an inner surface 7 along the outer cover 4. The outer cover 4 and the plug 14 may be composed of a silicone and/or other suitable material(s). The outer cover 4 overlays at least a portion of the surface 18 of the mannequin 2. The pocket 6 is a cavity which extends into the mannequin 2 from the surface 18. The pocket 6 is sized so as to properly receive the insert 8 and the plug 14. The outer cover 4 is removably secured to the mannequin 2 so as to conceal the plug 14, the pocket 6, and the insert 8 when overlaying the surface 18. The outer surface 15 of the outer cover 4 may include coloration, texturing, and/or other feature(s) so as to match or approximate the surface 18 of the mannequin 2.

Referring again to FIG. 3, the plug 14 includes a face 30 surrounded by one or more sides 31. In one non-limiting example, a single circular-shaped side 31 may define a likewise-shaped side wall 29. In another non-limiting example, two or more planar and/or non-planar sides 31 may define a multi-sided side wall 29. The side wall 29 is disposed between the inner surface 7 and the face 30. The side wall 29 and the face 30 in combination determine the shape of the plug 14, as well as the depth-wise extension of the plug 14 with respect to the outer cover 4.

Figure 2:
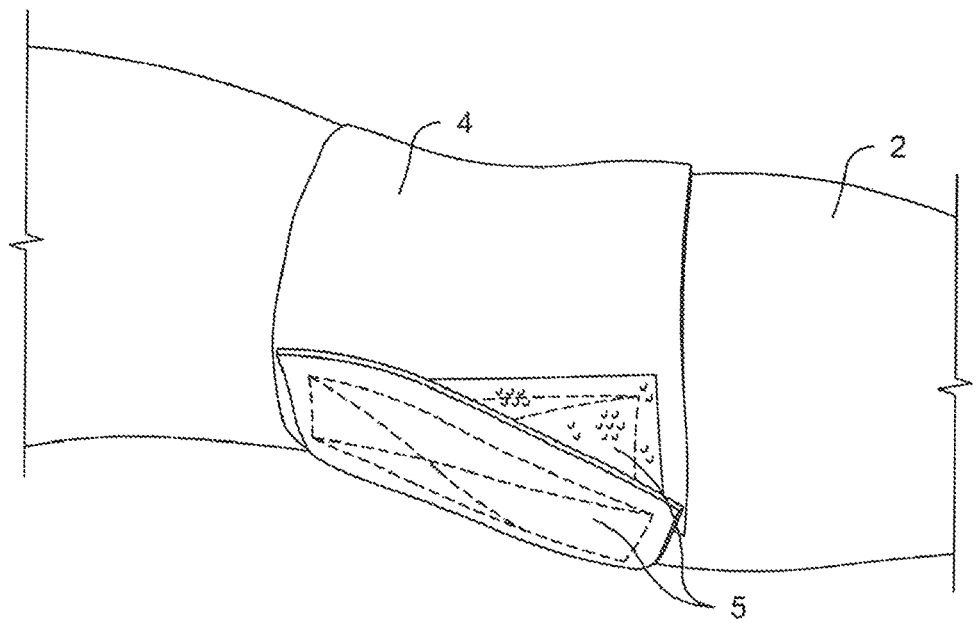
FIG. 2 is an enlarged, rear-side view illustrating attachment of an outer cover of an injection-site simulant to a mannequin in accordance with an embodiment of the disclosure.

Referring now to FIG. 2, the outer cover 4 may completely surround the mannequin 2 in some embodiments. In other embodiments, the outer cover 4 may partially surround the mannequin 2. In yet other embodiments, the outer cover 4 may be secured to the mannequin 2 via an adhesive or other suitable means. In still other embodiments, the outer cover 4 may be recessed along the mannequin 2 so as to minimize visual cues relevant to location of the injection-site simulant 3. In preferred embodiments, the outer cover 4 is secured in a non-recessed arrangement about the mannequin 2 via a fastener 5, a non-limiting example of the latter being a hook-and-loop closure as depicted by way of example in FIG. 2. In all embodiments, the outer cover 4, as well as the insert 8, are separable from the mannequin 2 so that one or both are replaceable.

Figure 8:
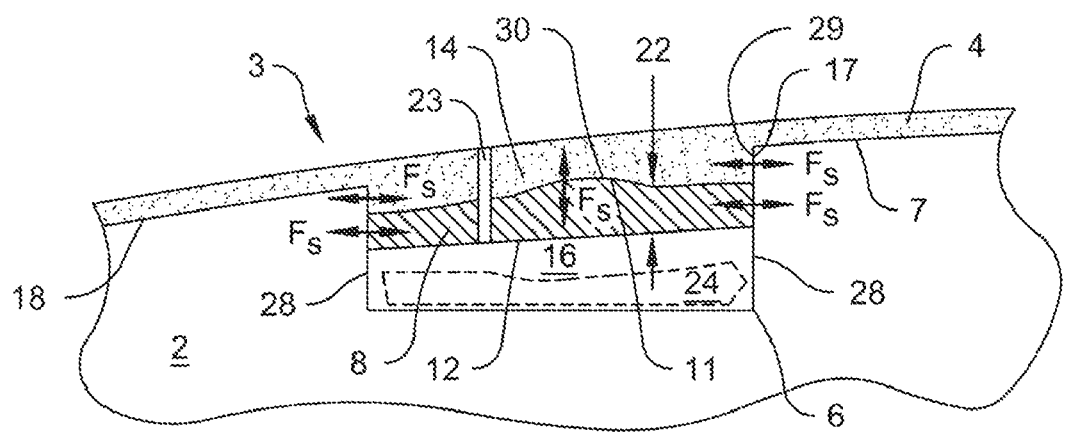
FIG. 8 is a cross-section view taken along line 8-8 in FIG. 4 illustrating an outer cover with a plug, a pocket, and an insert of an injection-site simulant disposed along a mannequin wherein the pocket within the mannequin and the insert cooperate to form a cavity within the pocket in accordance with an embodiment of the disclosure.
Figure 9:
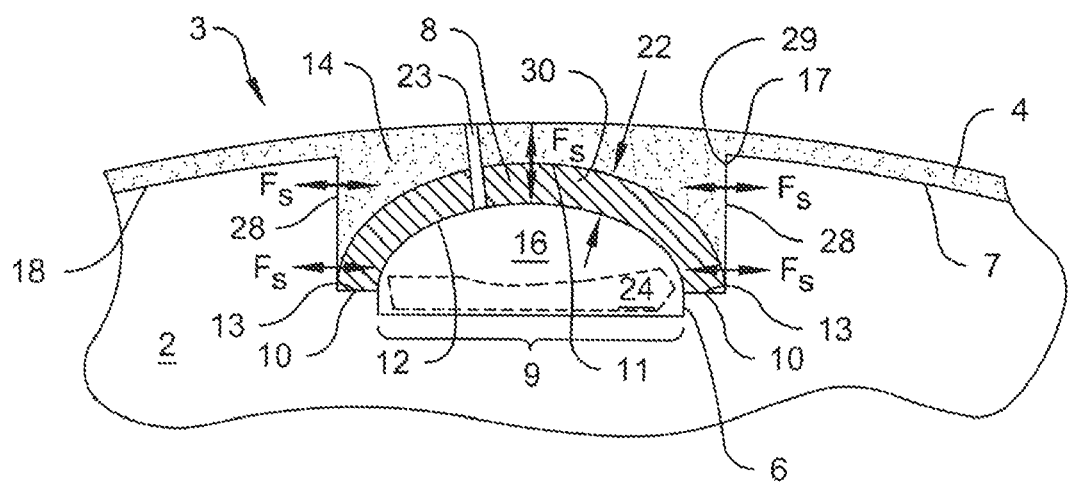
FIG. 9 is a cross-section view taken along line 9-9 in FIG. 4 illustrating an outer cover with a plug, a pocket, and an insert of an injection-site simulant disposed along a mannequin wherein the pocket within the mannequin and the insert cooperate to form a cavity within the pocket in accordance with an embodiment of the disclosure.

Referring now to FIGS. 5 and 6, the insert 8 is shaped and sized to approximate a bone structure within an injection site. The insert 8 may be fabricated from a urethane or other suitable material(s). In preferred embodiments, the exterior 11 of the insert 8 should include surface and/or shape features which permit proper location of an injection site via tactile means typically employed during an intraosseous infusion procedure. The insert 8 includes a cross-sectional shape enabling simulation of at least a portion of a hard exterior 20 of a bone 19 which otherwise surrounds a cavity with marrow 21 therein, such as generally illustrated by way of non-limiting example in FIG. 12. In preferred embodiments, the insert 8 includes an interior 12 which cooperates with the exterior 11 to approximate the shape and/or the thickness 22 of the hard exterior 20 and at least a portion of the volume wherein the marrow 21 resides. The offset between the exterior 11 and the interior 12 defines the thickness 22, as illustrated in FIGS. 8 and 9. The thickness 22 may be uniform or vary along the insert 8. The insert 8 may include a pair of ends 13 which facilitated proper seating of the insert 8 within a pocket 6. In preferred embodiments, the insert 8 is curved between the ends 13.

Figure 7:
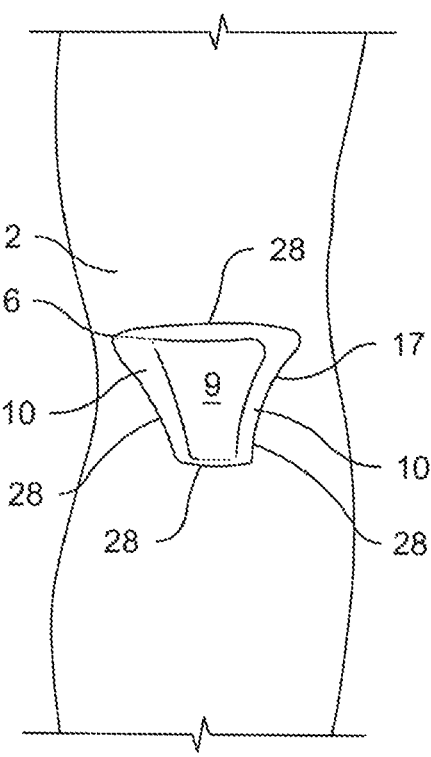
FIG. 7 is a front-side view illustrating a pocket of an injection-site simulant (insert and outer cover not shown) wherein the pocket extends into a mannequin and the pocket is shown with a pair of optional shoulders disposed about a channel in accordance with an embodiment of the disclosure.

Referring now to FIGS. 8 and 9, the pocket 6 is defined by a wall 17 which extends into the mannequin 2 from the surface 18. The wall 17 is further defined by one or more planar and/or non-planar sides 28 formed by the mannequin 2 within the pocket 6. In one non-limiting example, the wall 17 may be formed by two planar sides 28 and two non-planar sides 28 as illustrated in FIG. 7. In another non-limiting example, the wall 17 may be formed by a single, circular-shaped side 28. The pocket 6 is shaped and sized via the shape(s) and number of sides 28 so as to accept the insert 8 and the plug 14. In preferred embodiments, the opening formed by the pocket 6 via the wall 17 should complement the shape and size of the plug 14 formed by the side wall 29.

Referring again to FIGS. 8 and 9, the insert 8 and the pocket 6 cooperate so that a cavity 16 is formed when the insert 8 is positioned within a lower portion of the pocket 6. In this arrangement, the cavity 16 occupies a portion of the total volume within the pocket 6. The cavity 16 is generally located where marrow resides within a bone. The cavity 16 is sized so as to accept and confine fluid injected into the injection-site simulant 3 during use. In some embodiments, the cavity 16 is a void within the injection-site simulant 3. In other embodiments, an optional fill 24 may partially or completely occupy the cavity 16. The fill 24 may simulate absorption properties of a bone marrow.

Referring again to FIGS. 8 and 9, the plug 14 extends from the inner surface 7 of the outer cover 4 so as to reside within an upper portion of the pocket 6 when the outer cover 4 is applied to the mannequin 2. This arrangement generally places the plug 14 between the surface 18 of the mannequin 2 and the exterior 11 along the insert 8. The outer cover 4 and the plug 14 simulate skin/tissue/flesh/muscle, referred to generally as skin, covering a bone simulated by the insert 8. When in use, a hole 23 is formed through the outer cover 4, the plug 14, and the insert 8 so that a fluid is introducible into the cavity 16 via a syringe or other means associated with an intraosseous infusion procedure. The thickness 22 of the insert 8 may dimensionally correspond to the hard exterior 20 of a bone 19 so as to approximate the difficulty and/or the time required to properly form a hole 23 at an injection site. The plug 14 sealingly contacts and cooperates with at least one of the insert 8 or the wall 17 so as to confine a fluid within the cavity 16.

Referring again to FIGS. 8 and 9, the plug 14 and the insert 8 may contact either without sealing or with sealing. In some embodiments, a sealing force $F_S$ may be applied by either the plug 14 or the insert 8 at contact between the face 30 of the plug 14 and the exterior 11 of the insert 8. The sealing force $F_S$ is applied when one or more dimensional properties of the plug 14 and/or the insert 8 exceed the depth and/or other dimension(s) permitted for both the plug 14 and the insert 8 within the pocket 6. The sealing force $F_S$ is understood to include a compressive-type force at contact along the interface between the face 30 of the plug 14 and the exterior 11 of the insert 8 wherein the compressive contact avoids leakage of a fluid from the cavity 16 across the interface.

Referring again to FIGS. 8 and 9, the plug 14 and the pocket 6 may contact either without sealing or with sealing. In some embodiments, a sealing force $F_S$ may be applied by either the plug 14 or the pocket 6 at contact between the side wall 29 of the plug 14 and the wall 17 of the pocket 6. In one example, the plug 14 may be dimensionally larger than the pocket 6 so that the side wall 29 applies a sealing force $F_S$ in the direction of the wall 17. In another example, the pocket 6 may be dimensionally smaller than the plug 14 so that the wall 17 applies a sealing force $F_S$ in the direction of the side wall 29. The sealing force $F_S$ is understood to mean a compressive-type force at contact along the interface between the wall 17 of the pocket 6 and the side wall 29 of the plug 14 wherein the compressive contact avoids leakage of a fluid from the cavity 16 across the interface.

Referring again to FIGS. 8 and 9, the insert 8 and the pocket 6 may contact either without sealing or with sealing. In some embodiments, a sealing force $F_S$ may be applied by either the insert 8 or the pocket 6 at contact between the insert 8 and the wall 17 of the pocket 6. In one example, the insert 8 may be dimensionally larger than the pocket 6 so that the insert 8 applies a sealing force $F_S$ in the direction of the wall 17. In another example, the pocket 6 may be dimensionally smaller than the insert 8 so that the wall 17 applies a sealing force $F_S$ in the direction of the insert 8. The sealing force $F_S$ is understood to include a compressive-type force at contact along the interface between the wall 17 of the pocket 6 and a portion along or adjacent to the exterior 11 of the insert 8 wherein the compressive contact avoids leakage of a fluid from the cavity 16 across the interface.

Referring now to FIGS. 9 and 7, the pocket 6 which extends into the mannequin 2 may include an optional channel 9 disposed between a pair of shoulders 10. Each shoulder 10 may extend from the wall 17 so as to alter the profile of the pocket 6 wherein the channel 9 is less wide than other portions of the pocket 6. Each end 13 of the insert 8 may contact a respective shoulder 10 when the insert 8 is properly seated within the pocket 6. In this arrangement, the cavity 16 also includes the volume provided within the channel 9. In other embodiments, it may be advantageous for one of the two ends 13 and one of the two shoulders 10 to sealingly contact and another one of the two ends 13 and another one of the two shoulders 10 to sealingly contact.

Referring now to FIG. 10, it may be advantageous for the intraosseous infusion trainer 1 to further include an optional case 25. In these embodiments, the mannequin 2 and the injection-site simulant 3 are disposed within the case 25. The mannequin 2 and injection-site simulant 3 either may remain within the case 25 in use or may be separable from the case 25 prior to use. The case 25 may include an optional lid 32 so that the intraosseous infusion trainer 1 may be protectively enclosed within the case 25 when not in use.

Referring now to FIG. 11, the pocket 6 of the injection-site simulant 3 along the mannequin 2 may include an optional channel 9 disposed between one or more shoulders 10. In one non-limiting example, a single, circular-shaped shoulder 10 may define a like-shaped channel 9. In another example, two or more shoulders 10 could completely or partially bound the channel 9. Each shoulder 10 may extend from the wall 17 formed by the mannequin 2 so as to alter the profile of the pocket 6 wherein the channel 9 is less wide than other portions of the pocket 6. Each shoulder 10 may further include an optional flange 26 which extends therefrom in the direction of the insert 8. The flange(s) 26 may engage a respective end(s) 13 of the insert 8 about the cavity 16. In some embodiments, the flange(s) 26 and the respective end(s) 13 may sealingly contact so as to minimize leakage of fluid from the cavity 16. In other embodiments, the flange(s) 26 and the respective end(s) 13 may contact without sealing. In the latter embodiments, the flange(s) 26 enlarges the volume of the channel 9 so as to minimize spillage of fluid from the cavity 16 when the intraosseous infusion trainer 1 is rotated.

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

What is claimed is:

1. An intraosseous infusion trainer comprising:
   (a) a mannequin configured as a body at least in part; and
   (b) an injection-site simulant which comprises a pocket, an insert, and an outer cover;
   wherein
      said pocket having a wall which extends into said mannequin,
      said insert disposed within said pocket,
      said outer cover includes a plug which extends into said pocket,
      said outer cover conceals said insert, said pocket, and said plug,
      said pocket and said insert cooperate to form a cavity therebetween,
      said cavity capable of receiving a fluid injected, in use, into said injection-site simulant, and
      said plug sealingly contacts and cooperates with at least one of said insert or said wall to confine said fluid within said cavity.

2. The intraosseous infusion trainer of claim 1, wherein said outer cover simulates a skin.

3. The intraosseous infusion trainer of claim 1, wherein said outer cover being removably secured to said mannequin, said mannequin comprises a silicone.

4. The intraosseous infusion trainer of claim 1, wherein said outer cover being secured to said mannequin via a fastener.

5. The intraosseous infusion trainer of claim 1, wherein said insert simulates a hard exterior of a bone.

6. The intraosseous infusion trainer of claim 1, wherein said pocket includes a channel between a pair of shoulders which extend from said wall, said channel being a portion of said cavity.

7. The intraosseous infusion trainer of claim 6, wherein said insert being curved between a pair of ends, one said end and one said shoulder sealingly contact, other one said end and other one said shoulder sealingly contact.

8. The intraosseous infusion trainer of claim 1, wherein said insert and said wall sealingly contact.

9. The intraosseous infusion trainer of claim 8, wherein a sealing force being applied by at least one of said insert or said wall at contact between said insert and said wall.

10. The intraosseous infusion trainer of claim 1, wherein a sealing force being applied by at least one of said plug or said insert at contact between said plug and said insert.

11. The intraosseous infusion trainer of claim 1, wherein a sealing force being applied by at least one of a side wall of said plug or said wall at contact between said plug and said pocket.

12. The intraosseous infusion trainer of claim 1, wherein said cavity disposed where a marrow resides within a bone.

13. The intraosseous infusion trainer of claim 1, wherein said outer cover being replaceable.

14. The intraosseous infusion trainer of claim 1, wherein a fill resides within said cavity.

15. The intraosseous infusion trainer of claim 1, wherein said insert being replaceable.

16. The intraosseous infusion trainer of claim 1, wherein said insert simulates a bone, said bone being one of a tibia bone, a femur bone, a pelvic bone, a humerus bone, or a sternum bone.

17. The intraosseous infusion trainer of claim 1, wherein said body being one of a leg, an arm, a shoulder, a torso, a chest, or a pelvis.

18. The intraosseous infusion trainer of claim 1, wherein said intraosseous infusion trainer disposed within a case.

19. The intraosseous infusion trainer of claim 1, wherein said fluid injected into said cavity via a hole formed, in use, through said outer cover, said plug, and said insert.

20. The intraosseous infusion trainer of claim 1, wherein said pocket includes a channel bounded by a shoulder which extends from said wall, said channel being a portion of said cavity, said insert includes an end which engages a flange extending from said shoulder.

\* \* \* \* \*